J. ROWE.
NON-SKID DEVICE FOR TIRES.
APPLICATION FILED MAR. 26, 1917.
1,256,732.
Patented Feb. 19, 1918.
2 SHEETS—SHEET 1.
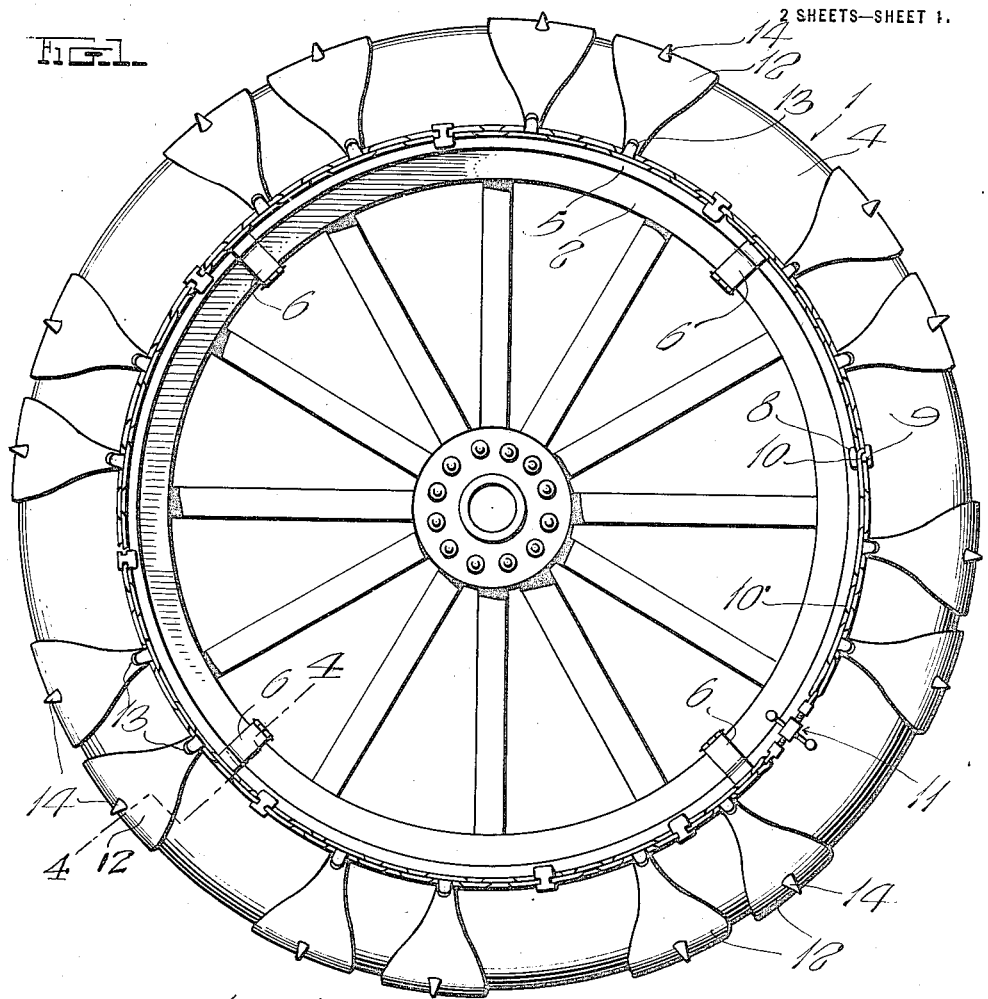
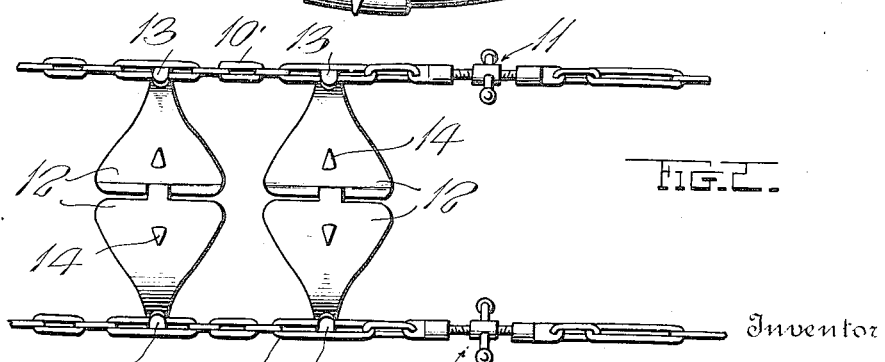
Witness
H. Woodard
Inventor
John Rowe
By H. B. Wilson & Co.
Attorneys

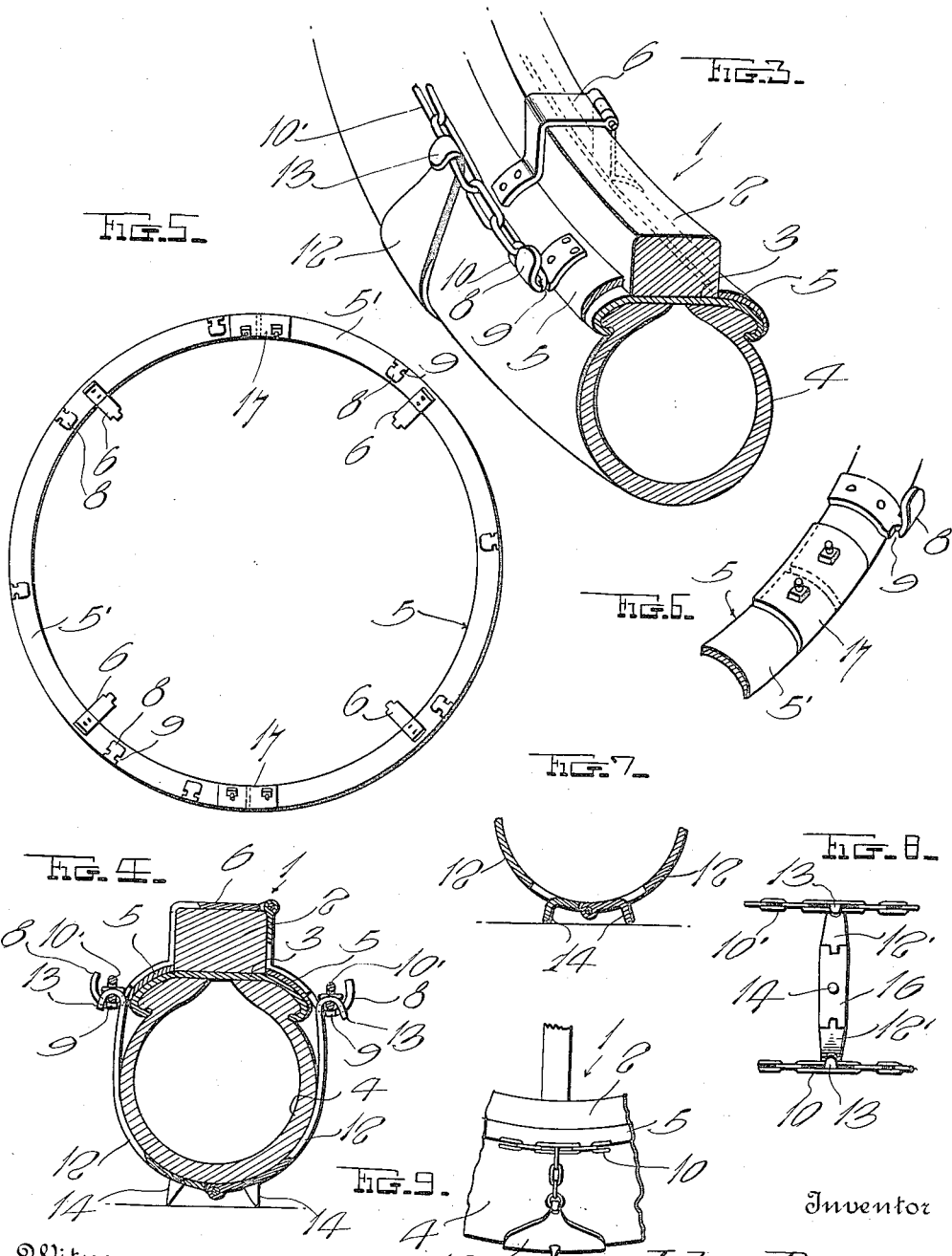

UNITED STATES PATENT OFFICE.

JOHN ROWE, OF CASEY, IOWA.

NON-SKID DEVICE FOR TIRES.

1,256,732.

Specification of Letters Patent. Patented Feb. 19, 1918.

Application filed March 26, 1917. Serial No. 157,507.

*To all whom it may concern:*

Be it known that I, JOHN ROWE, a citizen of the United States, residing at Casey, in the county of Guthrie and State of Iowa, have invented certain new and useful Improvements in Non-Skid Devices for Tires; and I do declare the following to be a full, clear, and exact description of the invention, such as will enable others skilled in the art to which it appertains to make and use the same.

My invention relates to non-skid devices for tires and particularly to that class of non-skid devices which are adapted to be connected or secured on the tire by means of side chains.

The object of my invention is to provide a non-skid device of this character in which the side chains are held on the tire by means of annular retaining members secured on the wheel by novel means of fastening.

Another object of my invention is to provide a device of this character in which said members may be readily detached from the wheel when desired and which when in position on the wheel are so disposed as not to project beyond the frame or the sides of the wheel and are also disposed in such a manner that the pull exerted by the tread members of the wheel when in contact with the surface of the ground over which the wheel travels, will be taken up by annular retaining members which are permanently secured to the felly of the wheel.

Another object of my invention is the provision of a device of this character in which a slight movement of the tread members is permitted relative to the surface of the tire.

A further object of my invention is to provide novel means in a device of this character whereby the side chains may be applied at any desired point to the wheel without turning the wheel to reach a certain lug to which the chain is attached for starting.

With these general objects in view as stated above and with other objects that will appear from the description of my invention, my invention consists of the novel construction, combination and arrangement of parts to be hereinafter described and claimed, taken in connection with the accompanying drawings which form a part of this application and in which:

Figure 1 is a side elevation of a wheel showing my non-skid device applied thereto;

Fig. 2 is a plan view of a section of my tire chain;

Fig. 3 is a view in perspective of a portion of the wheel showing my invention applied in detail;

Fig. 4 is a sectional view taken substantially on the line 4—4 of Fig. 1;

Fig. 5 is a side elevation of the inner false rim, showing its manner of construction;

Fig. 6 is a detail view in perspective of one of the end plates fastening the ends of the inner rim as shown in Fig. 5;

Fig. 7 is a sectional view of a modified form of the tread members illustrated in Fig. 2;

Fig. 8 is a view of my tire chain in a slightly modified construction as applied to the front wheel of an automobile;

Fig. 9 is a side elevation of a slightly modified form of the connection of the tread members to the side chain.

To this end my invention comprises briefly side chains, between which are secured tread members extending transversely across the tire and provided with lugs to grip the surface of the ground and prevent skidding of the tire and which are so connected to the side chains as to permit slight movement of the tread members with respect to the surface of the tire. The side chains are retained on the wheel by means of hook members formed on a pair of annular retaining members which are adapted to be secured to the wheel by means of substantially U-shaped clevises extending across the felly of the wheel and secured to the retainers at their outer ends. The side chains are also provided with take up devices.

Referring more particularly to the drawings and describing my invention in detail, the numeral 1 designates generally a wheel of an automobile with a pneumatic tire secured in position on the ordinary clencher rim thereof, the numeral 2 designates the felly of the wheel to which is secured by any suitable manner of fastening a stationary rim 3 having as shown in my invention an inflated pneumatic tire 4 secured therein. On both sides of the wheel are placed annular retaining members 5 which are disposed concentrically with the stationary rim 3 and are so shaped as to have their inner edges in contact with the felly of the wheel and their outer edges disposed relatively flush with the outer edge of the stationary rim and the intervening body of the retainers being curved to conform with the curvature of the stationary rim. These retaining members 5 are disposed on the inner surface of the rim 3 and are connected together and retained on the wheel by means of substantially U-shaped clevises 6 extending across the felly 2 and secured by means of rivets or any suitable fasteners at its outer ends to the members 5. Along one of the inner edges of the felly this clevis member 6 is provided with a hinged connection which is of the ordinary construction having the ordinary pin extending through the hinge which may be removed in order to detach the two arms of the clevis member.

In the preferred embodiment of my invention there are at least four of these clevis members disposed at equi-distantly spaced points about the wheel and they are so shaped as to conform with the outline of the felly and owing to their hinged construction allow a slight flexibility to the connection between the two retaining members when the tread members are applied to the chains as will be hereinafter described.

At spaced intervals on the retainers 5 are disposed a series of hook members 8 which in this preferred embodiment comprise substantially rectangular steel bars secured at one end to the body of the adjacent retainer and bent near their other end inwardly upon themselves to form a hook to receive the side chain thereunder as will be hereinafter described. At the bent portion of these hook members alined notches 9 are provided in the opposite side edges in which any one of the links 10 of a side chain 10' may be engaged when it is desired to attach the side chain to the wheel. These side chains are constructed in the manner shown in Fig. 2 and are provided with take up devices which are generally designated at 11 so that they may be adjusted to any desired tightness when applied to the wheel.

Extending transversely between the side chains are tread members consisting of steel plates 12 bent to conform with the shape of the tire and which in my preferred form embody a pair of similarly formed plates hingedly connected along the center of the tread of the tire at their meeting points and provided with tapered hooked ends 13 for engagement in certain links of the side chains to retain the tread members on the tread of the tire. These tread members are preferably provided with lugs 14 which are suitably secured to the plates 12 and project on the outer surface thereof so as to prevent the wheel from skidding and are arranged in spaced relation on either side of the hinged connection of the plates along the center of the tire tread. These lugs 14 may be riveted to the plates and they may be formed of upwardly struck portions of the plates which are illustrated in Fig. 7.

This description of the tread members is confined to the form of tread members which I desire to employ on the rear wheels of an automibile, the form of tread connection on the front wheels being of a slightly different form as shown in Fig. 8 in which the plates 12' are joined by a central tread plate 16 having hinged connection with the plates 12' at each end and provided at its center with an upstanding lug 14 which is disposed substantially in the center of the line of tread of the wheel and will insure a grip of the front wheels on the surface of the road which merely facilitates the steering of the vehicle. In their manner of connection with the side chains these plates 12' are formed similar to the plates 12 hereinbefore described.

The annular retainer which is disposed on the inner side of the wheel adjacent the body of the vehicle is preferably formed in two sections 5' which are separably connected by means of plates 17 which are shaped to conform with the body of the rim and are connected to the adjacent ends of the sections by means of bolts having nuts threaded on their ends and extending through the sections and through the plate. This construction permits the detaching of the two sections of the annular retainer and in a detached condition the sections may be readily passed over the axle of the vehicle when it is desired to remove the retainer from the wheel.

In Fig. 9 of my invention I have illustrated a slightly modified form of the manner of attaching the tread members to the side chains which consists in providing a linked connection between the side chain and the hook formed on the end of the tread plate. These tread members are preferably arranged in pairs about the periphery of the tire and the links of the side chain through which the hooks on the end of the tread plates are engaged are preferably elongated so as to permit of a slight movement of the tread plate on the surface of the tire when the biting lugs on the plate are engaged on the surface of the ground. By this construction, it will be seen that the tread plates are enabled to take a firm hold without a sudden jerk which will most often cause the biting lug to plow through the ground without taking the grip required.

In the operation of my device, when it is desired to apply the same to the wheel the two annular retainers are placed on opposite sides of the wheel and the inner retainer connected by means of the connecting plates hereinbefore described, after which the clevises are connected by inserting the pin in the hinge at the meeting points of the two arms of the clevis which serves to secure the retainer on the wheel. The side chains are then applied with an end link of the chain engaged in the notch in the side face of one of the hook members formed on the retainers and continued around the tire under each of the remaining hook members back to the first mentioned hook where the free end link is disposed in the opposite notch the hook, thereby effectively securing the side chain on the retainer. These side chains are preferably already provided with the tread members connected therebetween but if it is desired, additional tread members may be inserted in the chains or tread members having different configuration and substituted in place of those already in position by lifting the links of the chain engaged over the hooked free end of the plate, which movement is permitted by the flexibility obtained by the hinged construction of the clevis joining the two retainers which allows them to be moved laterally with respect to the side of the wheel. When it is desired to detach the device from the wheel, it is merely necessary to draw out the pins connecting the hinges of the clevises and detach the plates connecting the ends of the two sections of the false rim whereby the entire device may be removed from the wheel.

Owing to the construction and shape of these retainer members it will be seen that they are applied to the stationary rim so that the strain exerted on the chains by the tread members when the same are engaged in the surface of the ground over which the wheel travels will be taken up by the hook members secured on the retainers, which owing to their connection with the stationary rim of the wheel will bring the strain upon the rim itself at substantially its strongest point of connection with the felly, thereby insuring a safe connection and producing the best results with a minimum wear on the parts of the device as applied.

While I have described and shown certain specific forms of construction and details in the accompanying drawings and elaborated on them in the description, I desire to have it understood that I do not limit myself particularly to the details as shown and described but that any changes may be made in the form and details of construction as may fall within the scope of the appended claims.

I claim:

1. A device of the character described, comprising an annular member to be loosely disposed on the felly of a wheel against the inner surface of the wheel rim, means for maintaining said member on the felly and against said rim, and means on said member to retain an anti-skid device on the tire.

2. In a wheel, the combination of an annular member concentrically disposed with respect to the rim and in loose contact with a portion thereof, means on said member for engagement with the felly to retain said member against the wheel rim, hooks carried by said member, and a non-skid device on the tire for engagement with said hooks.

3. A device of the character described comprising a pair of annular members concentrically disposed with respect to the rim on opposite sides of a wheel, said members being disposed upon the inner surface of the wheel rim, a substantially U-shaped clevis member extending across the felly and secured to said members at its outer ends whereby to retain said members on the wheel, said clevis member being separable whereby to remove the members from the wheel, and means on said members to engage and retain a non-skid device on the tire.

4. A device of the character described comprising a pair of annular members concentrically disposed with respect to the rim on opposite sides of a wheel, said members being formed so as to be disposed against the felly and upon the inner surface of the wheel rim, a substantially U-shaped clevis member having its arms hingedly and separably connected and disposed across the felly and secured to said members at its outer ends to retain said members on the wheel, one of said members being separable and means on said members to retain a non-skid device on the tire.

In testimony whereof I have hereunto set my hand in the presence of two subscribing witnesses.

JOHN ROWE.

Witnesses:
EMMETT S. HARDEN,
H. N. BERRY.